April 26, 1960  G. E. SYKORA  2,934,589
ELECTRICAL LEAD-THROUGH

Filed Feb. 6, 1957　　　　　　　　　　　　2 Sheets-Sheet 1

INVENTOR.
GEORGE E. SYKORA
BY
ATTORNEY

April 26, 1960     G. E. SYKORA     2,934,589
ELECTRICAL LEAD-THROUGH
Filed Feb. 6, 1957     2 Sheets-Sheet 2

INVENTOR.
GEORGE E. SYKORA
BY
*Robert K. Schumacher*
ATTORNEY

United States Patent Office 2,934,589
Patented Apr. 26, 1960

2,934,589

ELECTRICAL LEAD-THROUGH

George E. Sykora, Tulsa, Okla., assignor to Well Surveys, Incorporated, a corporation of Delaware Application February 6, 1957, Serial No. 638,560

2 Claims. (Cl. 174—50.52)

This invention relates to electrical lead-throughs and particularly to electrical lead-throughs which have high thermal and electrical insulating properties and which can withstand high pressure differentials and undergo severe mechanical shock.

In the art of radioactivity well logging, subsurface instruments are lowered many thousands of feet below the surface of the earth to measure radioactivity in the formations surrounding the borehole. The instruments employed in making radioactivity logs may include ionization chambers containing gas at several atmospheres pressure. In such instances, the material from which the seal is formed must be chemically inert so as not to contaminate the gas in the chamber. On the contrary, the instrument may contain evacuated chambers for thermal insulation wherein the pressure is of the order of $10^{-5}$ p.s.i. In either event, electrical lead-throughs are required which can serve as pressure seals to prevent leakage of gas or fluid into or out of these chambers and which will not be materially affected by thermal changes. In logging deep wells, temperatures up to about 350° F. may be encountered, and the pressure in the well may become as much as 20,000 p.s.i. Moreover, as the instrument traverses the borehole, it may bang against the sides of the well causing severe mechanical shock to the components of the instrument. These conditions place rigid requirements on any lead-through which is to be employed.

To further complicate the conditions which the lead-throughs must meet, the instruments may include artificial neutron sources which require extremely high voltage, of the order of 250,000 volts, for operation, and the lead-throughs may be called upon to pass these voltages into a highly pressurized chamber. Accordingly, it will be seen that a lead-through, in order to meet the rigors of radioactivity well logging must have high thermal and electrical insulating properties and must be able to withstand severe mechanical shock in addition to providing a leak-proof seal in the presence of extreme pressure differentials.

Numerous types of lead-throughs have been proposed previously for radioactivity well logging. However, none have been found heretofore which were capable of meeting all of the rugged requirements necessary for such work.

The disadvantages of prior art lead-throughs are overcome with the present invention and a novel lead-through is provided which is mechanically rugged and has high thermal and electrical insulating properties together with the ability to provide a leak-proof pressure seal and which has proven to be highly satisfactory in use even under the most severe conditions of radioactivity well logging. Moreover, the lead-through of the present invention is chemically inert so that it will not contaminate gases in an ionization chamber or the like.

The advantages of the present invention are preferably attained by providing an electrical lead-through formed of sapphire together with novel means for securing the lead-through in a desired location.

Accordingly, it is an object of the present invention to provide a novel electrical lead-through.

An additional object of the present invention is to provide a novel electrical lead-through which has high thermal and electrical insulating properties and which is capable of withstanding severe mechanical shock and high pressure differentials.

Another object of the present invention is to provide a novel electrical lead-through for use in radioactivity well logging.

A specific object of the present invention is to provide a novel electrical lead-through formed of synthetic sapphire together with novel means for securing the lead-through in a desired location.

These and other objects and advantages of the present invention will be apparent from the following description wherein reference is made to the figures of the accompanying drawings.

Figure 1:
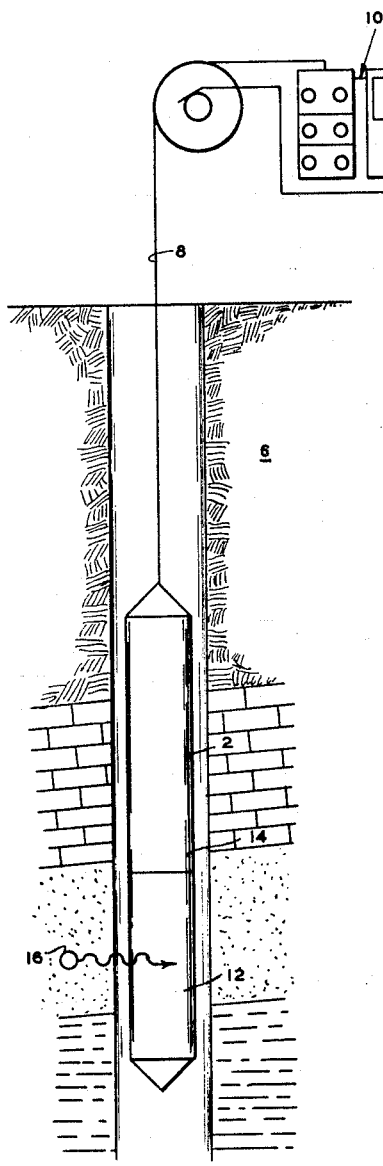
Fig. 1 is a diagrammatic representation of a typical radioactivity well logging device in which the lead-throughs of the present invention may be employed.

In those forms of the invention chosen for purposes of illustration in the drawings, Fig. 1 shows a diagrammatic representation of a typical radioactivity well logging apparatus in which the lead-throughs of the present invention may be employed. The device of Fig. 1 is intended for making logs of the natural radioactivity which is found in all rock. Thus, the apparatus includes a subsurface instrument 2 which is suspended in a bore-hole 4 penetrating the earth 6. The instrument 2 is suspended in the bore-hole 4 by means of a cable 8 which contains a conductive element over which signals from the instrument 2 are transmitted to a recording device 10 at the surface of the earth. The instrument 2 may comprise a radiation detector 12 which forms the lower part of the instrument 2 and is attached to an electronic portion 14 which will include amplifying and signal processing circuits and other suitable or desirable electronic equipment. With this arrangement, radiation 16 from the formations penetrate the detector 12 which provides a signal indicative of the radiation. This signal may then be translated into an electrical signal which is transmitted up the cable to the recording device in a manner which is well known in the art.

Figure 2:
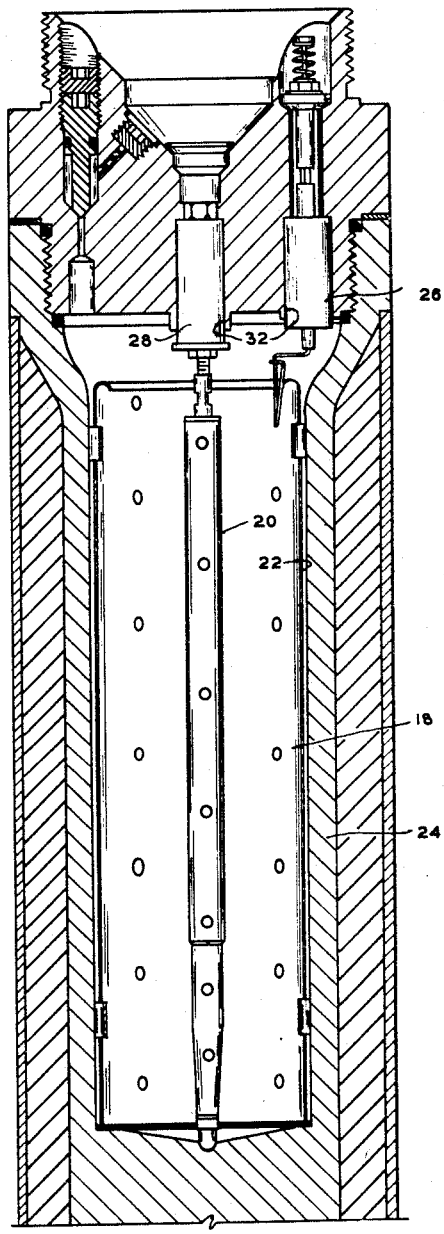
Fig. 2 is a vertical section through a typical ionization chamber embodying the present invention.

The detector 12 may comprise an ionization chamber 18, as seen in Fig. 2, which is filled with an ionizable gas, such as argon or boron trifluoride, under considerable pressure. Pressures may be of the order of 1,000 p.s.i. Within the chamber 18, are located a central electrode 20 and an outer electrode or "pail" 22. With this arrangement, radiations penetrating into the chamber 18 will ionize the gas and with an electrical potential between the electrodes 20 and 22, the ions may be collected to provide an indication of the radiation.

As stated above, pressures as high as 20,000 p.s.i. may be encountered in some boreholes. Consequently, the walls 24 of the chamber 18 must be formed of an extremely strong material, such as alloy steel, which will not react with the gas in the chamber 18, lest the ionizing properties of the gas be destroyed. Means must be provided to make insulated electrical connections to the electrodes 20 and 22 through walls 24 without allowing the gas to escape. The lead-throughs of the present invention, indicated at 26 and 28 in Fig. 2, are ideally suited for this purpose.

Figure 3:
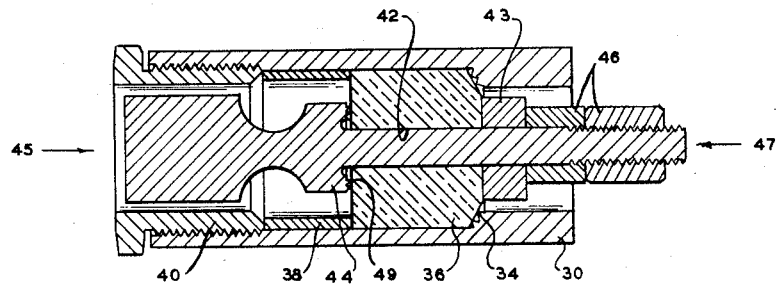
Fig. 3 is a vertical section through a typical lead-through embodying the present invention.

Lead-throughs 26 and 28 may be substantially identical and may be formed as shown in Fig. 3. The lead-throughs comprise a sleeve 30 which may be secured in a recess 32 in the wall 24 of the chamber 18 in any suitable manner, as by soldering, welding or the like. The sleeve 30 is preferably formed with a seat portion 34 which engages an insulating member 36. The insulating member 36 may be secured in place by any suitable means as by a sleeve 38 and nut 40 which is threadedly connected to the sleeve 30. The insulating member 36, in addition to preventing electrical losses, must serve as a pressure seal to preclude the gas in the chamber 18 from escaping and must be able to withstand mechanical shocks when the instrument strikes the wall of the borehole. It will be seen that with the mounting shown in Fig. 3, sleeve 30 will be in tension while sleeve 38 is in compression. Thus, the seat 34 on sleeve 30 prevents movement of the insulating member 36 in one direction while sleeve 38 and nut 40 prevent movement in the opposite direction and assure a leak-proof seal. Sleeve 38 is formed of resilient metal and serves as a spring to prevent the insulating member 36 from being crushed when nut 40 is tightened. More important, the spring action with sleeve 30 in tension and sleeve 38 in compression keeps the insulating member 36 in sealing engagement with seat 34 even when back pressure and differences in thermal expansion tend to break the seal.

It has been found that sapphires and the mounting of the present invention are uniquely suited to this use. Sapphires may be produced synthetically up to about 2 inches in diameter, and have an electrical resistivity of approximately $10^{13}$ megohms over temperature ranges from well below zero to several thousand degrees above. Moreover, sapphire is extremely strong in compression and, in fact, can withstand compressive forces up to 300,000 p.s.i. With the mounting of Fig. 3, the sapphire will be in compression regardless of which way the pressure is applied. Thus, if pressure is applied from end 45 of the device, the sapphire insulating member 36 will be compressed against the seat 34 and will serve as a pressure restraining member. On the other hand, pressure from end 47 will compress the sapphire insulating member 36 against the resilient action of sleeve 38 and nut 40. Nut 40 is tightened to deform the sleeves thereby to provide the sufficient spring action to overcome the force created by pressures likely to be encountered from end 47. Lead-throughs, similar to that of Fig. 3, have actually been made employing sapphire as the insulating member and have withstood pressures as high as 30,000 p.s.i. In addition, the sapphire is chemically inactive and will not contaminate the gas in the chamber 18.

Figure 5:
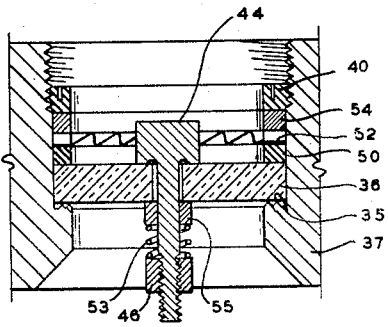
Fig. 5 is a vertical section through a modified lead-through embodying the present invention.

With the structure thus far described, the device of the present invention constitutes a compact unit which may readily be installed in an opening in any wall across which there is a pressure differential to provide an extremely effective pressure seal or window. This is of particular value for use in the walls of atomic reactors, guided missiles, rockets and high altitude aircraft. The device may be installed by simply inserting the device in a desired opening and securing the sleeve 30 to the wall to be sealed by welding, soldering or other suitable means. Obviously, if desired, the sleeve 30 may be omitted, as seen in Fig. 5, and a seat 35, corresponding to seat 34 of Fig. 3, may be formed on the wall 37 to be sealed. The other components of the device are then assembled as described above.

Figure 4:
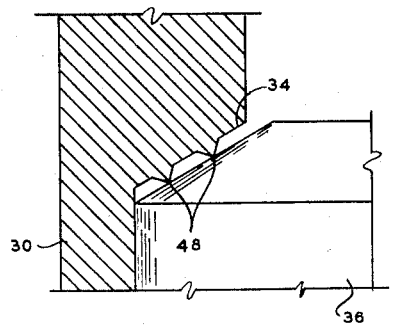
Fig. 4 is a sectional view showing a detail of construction of the device of Fig. 3.

To provide an electrical lead-through, as for connection to the electrode 20, an opening 42 is formed in the insulating member 36 and an electrically conductive element 44 having a head formed adjacent one end thereof is inserted through the opening 42 and may be secured in place in any suitable manner, as by collar 43 and lock nuts 46. It should be noted that surface 49 of the head of conductive element 44, preferably engages the surface of the insulating member 36 at the point spaced from the edge of opening 42 so as to prevent chipping the sapphire and to put element 44 in tension when nuts 46 are tightened. The tension on element 44 prevents the seal from leaking in the event of pressure from end 47 of the device, in the manner above-described for the outer seal at seat 34.

Where the pressure seal must be absolutely leak-proof, as in the present instance, the sleeve 30 is preferably formed of a material, such as a nickel-steel alloy, having a coefficient of expansion which is substantially the same as that of the sapphire. Moreover, any seat surfaces, such as 34 and 49, engaging the insulating member 36 are preferably formed of material having an elastic limit less than that of sapphire and are provided with a plurality of annular ribs or corrugations 48, as seen in Fig. 4. The sapphire is extremely hard and when the parts are secured together, for example, when nuts 40 and 46 are tightened, the sapphire will crush the ribs, thereby forming an effective gas seal, which is thereafter maintained by the above-described spring action.

Where it is desired to mount the lead-through in a wall formed of a material having a coefficient of expansion substantially different from that of sapphire, a gastight seal may still be obtained by employing the apparatus shown in Fig. 5, in which a seat 35 is formed in recess 32 of the wall 37. The insulating member 36 is mounted on seat 35 and a collar 50 is placed over member 36. An axially resilient spring 52 may be placed on the collar 50 and a second collar 54 is placed over the spring 52. Nut 40 may then be tightened to hold the assembly in place. With this arrangement, spring 52 will compensate for any differences in expansion and will serve to maintain the seal gas-tight over wide ranges of temperature. Conductor 44 may be secured in a similar manner, if desired. Thus, as seen in Fig. 5, tension is applied to nut 46 and, hence, to conductor 44 by means of spring 53 and collar 55.

It should be noted that while the lead-through of the present invention has been described in connection with its use in ionization chambers, the device is capable of many other uses. For example, the same qualities which recommend the lead-through of the present invention for use in ionization chambers make the devices even more suited for passing high voltages into the reaction chamber of an artificial neutron source, such as a deuterium-tritium reactor. In such instances, the voltages involved may be as high as a quarter million volts. At the same time, the lead-through must serve as a pressure seal to prevent loss of gas from the reaction chamber.

Furthermore, the thermal and electrical insulating characteristics of the lead-throughs of the present invention makes them particularly good for providing connections to photomultiplier tubes and similar equipment which must be kept in refrigerated vacuum flasks during well logging operations. Similarly, because of their thermal insulating and pressure resistant properties, the lead-throughs of the present invention are quite useful for high altitude application, for example, in space satellites, guided missiles, and aircraft.

Numerous other variations and modifications may also, obviously, be made without departing from the present invention. Accordingly, it should be clearly understood that those forms of the invention described above and shown in the figures of the accompanying drawings are illustrative only and are not intended to limit the scope of the present invention.

I claim:

1. An electrical lead-through comprising a sleeve having a seat formed within said sleeve first annular rib means formed on said seat and having an elastic limit less than that of sapphire, a sapphire insulating member engaging said first rib means and formed with an opening extending through said member, a resilient member within said sleeve adjacent said sapphire insulating member, means placing said sleeve in tension and said resilient means in compression to urge said sapphire insulating member into rib crushing engagement with said seat, a conductive member projecting through said opening, an enlarged portion of said conductive member being formed with second rib means to engage said sapphire in a region spaced from the edge of said opening, and means placing said conductive member in tension to crush said second rib means against said sapphire insulating member and secure said conductive member to said sapphire insulating member in sealing relationship.

2. An electrical lead-through comprising an apertured member having a seat formed within said aperture, first annular rib means formed on said seat, an electrically insulating member engaging said first rib means and formed of material having an elastic limit greater than that of said first rib means, an opening extending through said insulating member, a resilient member within said apertured member and adjacent said insulating member, means placing said apertured member in tension and said resilient member in compression to urge said insulating member into rib crushing engagement with said seat, a conductive member projecting through said opening, an enlarged portion of said conductive member formed with second rib means having an elastic limit less than that of said insulating member and positioned to engage said insulating member in a region spaced from the edge of said opening, and means placing said conductive member in tension to crush said second rib means against said insulating member and secure said conductive member to said insulating member in sealing relationship.

References Cited in the file of this patent
UNITED STATES PATENTS

| | | |
|---|---|---|
| 1,128,819 | Schmidt | Feb. 16, 1915 |
| 2,353,620 | Weinerth | July 11, 1944 |
| 2,471,437 | Lester | May 31, 1949 |
| 2,543,963 | Gaffin | Mar. 6, 1951 |
| 2,552,686 | Melcher | May 15, 1951 |
| 2,589,338 | Candelise | Mar. 18, 1952 |

FOREIGN PATENTS

| | | |
|---|---|---|
| 895,547 | France | June 16, 1944 |